United States Patent
Leang

(10) Patent No.: US 12,111,717 B2
(45) Date of Patent: Oct. 8, 2024

(54) RECONFIGURABLE VEHICLE ACCESSORY CONTROLLER

(71) Applicant: KC IP HOLDINGS, LLC, Gardena, CA (US)

(72) Inventor: Bobby Leang, Los Angeles, CA (US)

(73) Assignee: KC IP HOLDINGS, LLC, Gardena, CA (US)

( * ) Notice: Subject to any disclaimer, the term of this patent is extended or adjusted under 35 U.S.C. 154(b) by 0 days.

(21) Appl. No.: 18/342,955

(22) Filed: Jun. 28, 2023

(65) Prior Publication Data
US 2023/0341923 A1   Oct. 26, 2023

Related U.S. Application Data

(63) Continuation of application No. 17/235,766, filed on Apr. 20, 2021, now Pat. No. 11,693,473.

(51) Int. Cl.
*G06F 1/3287* (2019.01)
*B60R 16/02* (2006.01)

(52) U.S. Cl.
CPC ............ *G06F 1/3287* (2013.01); *B60R 16/02* (2013.01)

(58) Field of Classification Search
CPC ..... G06F 1/3287; B60R 16/02; B60R 16/023; B60R 16/03
See application file for complete search history.

(56) References Cited

U.S. PATENT DOCUMENTS

| | | | | |
|---|---|---|---|---|
| 9,346,423 | B2 * | 5/2016 | Yamazaki | F02N 11/04 |
| 2010/0253653 | A1 * | 10/2010 | Stambaugh | H03K 17/9622 |
| | | | | 345/184 |
| 2019/0322176 | A1 * | 10/2019 | Tanaka | B60K 35/00 |

* cited by examiner

*Primary Examiner* — Jacob M Amick
*Assistant Examiner* — Charles J Brauch
(74) *Attorney, Agent, or Firm* — Stetina Brunda Garred & Brucker

(57) ABSTRACT

A reconfigurable controller system for one or more switchable electronic devices has a relay junction with a plurality of relay connections, each of which includes at least a load circuit input, a load circuit output connectible to a respective one of the one or more switchable electronic devices, and a control circuit line. A controller head unit connectible to the relay junction includes a plurality of switch buttons, each with an independent indicator screen programmable with one or more display outputs, and associated output functions to a specific one the control circuit lines generated when the switch is actuated. A scroll dial is receptive to a rotary input that responsively switches, for one or more of the plurality of switch buttons, given ones of the display outputs and associated output functions to another one of the display outputs and associated output functions.

9 Claims, 4 Drawing Sheets

RECONFIGURABLE VEHICLE ACCESSORY CONTROLLER

CROSS-REFERENCE TO RELATED APPLICATIONS

This application is a continuation patent application of pending U.S. patent application Ser. No. 17/235,766 filed Apr. 20, 2021 and entitled "RECONFIGURABLE VEHICLE ACCESSORY CONTROLLER", the entire disclosure of which is wholly incorporated by reference herein.

STATEMENT RE: FEDERALLY SPONSORED RESEARCH/DEVELOPMENT

Not Applicable

BACKGROUND

1. Technical Field

The present disclosure relates generally to vehicle electronic equipment including lighting, visualization, communication devices, and control units therefor, and more particularly, to a reconfigurable vehicle accessory controller.

2. Related Art

Modern automobiles are equipped with numerous electronics systems that control aspects of vehicle operation, safety, driver assistance, and passenger comfort and entertainment. These include engine control electronics, transmission electronics, and chassis control electronics, and such systems are part of the original vehicle build.

Also part of the originally configured automobile are lighting systems that serve illumination, indication, and/or alert functions. For example, headlamps installed on the front end of the vehicle illuminate the travel path ahead, while the taillights installed on the rear end may indicate the presence of the vehicle to others traveling behind it. The taillight may be flashed at an increased intensity in response to the activation of the brakes, thereby alerting nearby vehicles that it is slowing down. Furthermore, the taillight cluster may include left and right turn signal lights, reverse indicator lights, and so forth.

Consumer demand has also been increasing for driver augmentation systems that utilize external imaging/sensing devices to improve safety such as rearward-looking backup cameras, forward-looking dash cameras, lane keeping assist systems, radar cruise control systems, pre-collision warning systems, and so forth. Vehicles that combine such features and more under a unified control system are capable of fully autonomous driving. With higher levels of sophistication being realized in electronic systems that benefit the driver, so has there been a demand for improved passenger comfort and entertainment systems.

Advancements in vehicle electronics systems have thus largely focused on the typical operating condition of on-road driving. However, vehicles are not limited to being driven on conventional paved roads, and there are many professional as well as recreational off-road driving applications that may take a vehicle through rough, unpaved trails comprised of gravel, rocks, sand, snow, and mud. Typical off-road vehicles are either designed or modified to have higher clearance and greater axle articulation, and further, may have drivetrains operable in four-wheel drive, locking differentials, off-road tires, and the like to better traverse the varied terrain.

Beyond these modifications, off-road vehicles may also be equipped with various auxiliary lights that provide additional illumination during nighttime/low visibility driving over difficult terrain, where careful and detailed identification is necessary for safe operation. Different types of auxiliary lights improve upon the illumination provided from the original equipment headlamps in different ways. For instance, spotlights may produce a focused beam of light to distances that extend beyond the light emitted from headlamps at greater illumination intensities. Floodlights may have a wider beam pattern at closer distances, while also outputting light after greater illumination intensities. Some auxiliary lights combine multiple spotlights in an array, also referred to as a light bar, while others combine different types to achieve a specific beam pattern. The need for auxiliary lighting is not limited to the vehicle exterior, and additional lighting may be installed for performing repairs and other tasks during nighttime.

Because vehicles operated off-road encounter additional hazards and conditions atypical for conventional vehicles operated on-road, several other specialized accessories are needed. One such electronic accessory is an onboard air compressor that is used to rapidly deflate and inflate tires to pressures for specific trail conditions. Additionally, the air compressor can be used to adjust settings on differential lockers to improve traction while traversing obstacles and uneven ground. Equipping off-road vehicles with recovery equipment such as motor-driven winches is also common. As a group activity, recreational and professional off-roading oftentimes involve multiple vehicles, so radios are installed for communications between and among drivers and other participants. Off-roading involves travelling to remote and unique destinations as well as driving in difficult terrain, so there is a desire to document the journeys with video footage and photographs. To this end, enthusiasts install dash cams and other electronic imaging devices on the vehicle.

Although many vehicle electronics systems and devices are intended to remain on while the vehicle is in operation and turned off otherwise, there are a few, particularly the aforementioned in which control independent of the vehicle ignition or accessory power is needed or desirable. Vehicle dashboards include blank slots in which individual slots designated for a given electronic device can be wired. However, the number of available slots is limited, and may be insufficient to operate all the accessories that have been installed on the vehicle. In response to this deficiency in the art, unified controllers that aggregate the switches of multiple accessories into a single head unit have been developed. Though there are many accessories available, the category or type are narrower, so such controllers were designed with certain limiting assumptions. That is, in a bank of switches, one set may be designated specifically for an exterior light bar, while another set may be designated for a winch, and so forth, with corresponding labels on the switch face. To the extent any customization was possible, it was limited to the replacement of one switch label/face for another of a different device category. With an ever-expanding availability of accessories, however, the constraints imposed by these pre-configured switch controllers were encountered. Touch screen displays with graphical icons that could be reconfigured for any device connected thereto were developed. Despite becoming increasingly acclimatized to touch screen interfaces, the lack of tactile feedback and other limitations of display-based interfaces have led a demand in the use of input devices capable of a more physical response. This need is particularly acute in the context of vehicle-based input devices, where an immediate and definite response that an input was registered is important amid the substantial movement by the user during operation.

Accordingly, there is a need in the art for an improved vehicle electronics accessories controller with programmability to accommodate a wide range of available devices. There is also a need in the art for a controller with physical switches and/or buttons with tactile feedback.

BRIEF SUMMARY

The present disclosure is directed to various embodiments of a reconfigurable controller system for one or more switchable electronic devices. The switch controller system may include a relay junction with a plurality of relay connections. Each of the relay connections may include at least a load circuit input, a load circuit output connectible to a respective one of the one or more switchable electronic devices, and a control circuit line. The system may also include a controller head unit that is connectible to the relay junction. The controller head unit may also include a plurality of first input devices, each of which may have an independent indicator screen. Additionally, each of the first input devices, which may be switch buttons, may be programmable with one or more display outputs for the indicator screen, as well as associated output functions to a specific one the control circuit lines generated in response to an actuation thereof. The controller head unit may also include a second input device such as a scroll dial that is receptive to an input that responsively switches, for one or more of the plurality of first input devices, given ones of the display outputs and associated output functions to another one of the display outputs and associated output functions of the corresponding ones of the first input devices.

Another embodiment of the present disclosure may be a reconfigurable switch controller that is connectible to one or more accessory devices. The controller may include a data processor, as well as a plurality of first input devices that each has an independent indicator screen. Each of the first input devices may be connected to the data processor and may be receptive to one or more display outputs generated by the data processor. Input commands may be transmitted to the data processor from actuated ones of the plurality of first input devices. The controller may also include a second input device that is receptive to an input, and may also be connected to the data processor. The data processor may define one or more input function mappings for each of the first input devices. A given one of the input function mappings may define an association of a specific one of the display outputs to an output function generated to a given one of the one or more accessory devices in response to a specific one of the input commands from an actuation of the first input device. One of one or more page sets of activated ones of input function mappings for each of the first input devices may be selectable based upon the input to the second input device.

Still another embodiment of the present disclosure may be a reconfigurable controller system for one or more switchable electronic devices. The controller system may include a relay junction with a plurality of relay connections. Each of the relay connections may include at least a load circuit input, a load circuit output connectible to a respective one of the one or more switchable electronic devices, and a control circuit line. The controller system may also include a controller head unit that is connectible to the relay junction. The controller head unit may have a data processor, and a data transmitter that is connected to the control circuit lines of the relay junctions. Additionally, the controller head unit may include a plurality of first input devices each having an independent indicator screen. The first input devices may each be connected to the data processor and can be receptive to one or more display outputs generated by the data processor. Input commands may be transmitted to the data processor from actuated ones of the plurality of the first input device. The data processor may define one or more input function mappings for each of the first input devices, and a given one of the input function mappings may define an association of a specific one of the display outputs to an output function generated to the data transmitter in response to a specific one of the input commands from an actuation of the first input device.

The present disclosure will be best understood accompanying by reference to the following detailed description when read in conjunction with the drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of a reconfigurable vehicle accessory controller system and is not intended to represent the only form in which such embodiments may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

The disclosed reconfigurable vehicle accessory controller system is contemplated to unify control of multiple electronic accessories, with the specific output function as well as the indicator display therefor being programmable to an arbitrary switch button. As discussed above, vehicles, and off-road vehicles in particular, may be equipped with a variety of electronic accessories such as light bars, fog lights, ditch lights, interior work lights, pneumatic compressors, recovery winches, navigation units, radios, refrigerators, and so on. Some vehicles marketed to off-road enthusiasts may be originally equipped with one ore more of these accessories, and the control input devices thereof such as toggle switches, pushbuttons, knobs, etc. are installed on the dashboard or other vehicle interior surface readily accessible to the driver. For the most part, however, these accessories are aftermarket parts, and the present disclosure contemplates their connection to the single controller system to eliminate separate and discrete control input devices.

Figure 1:
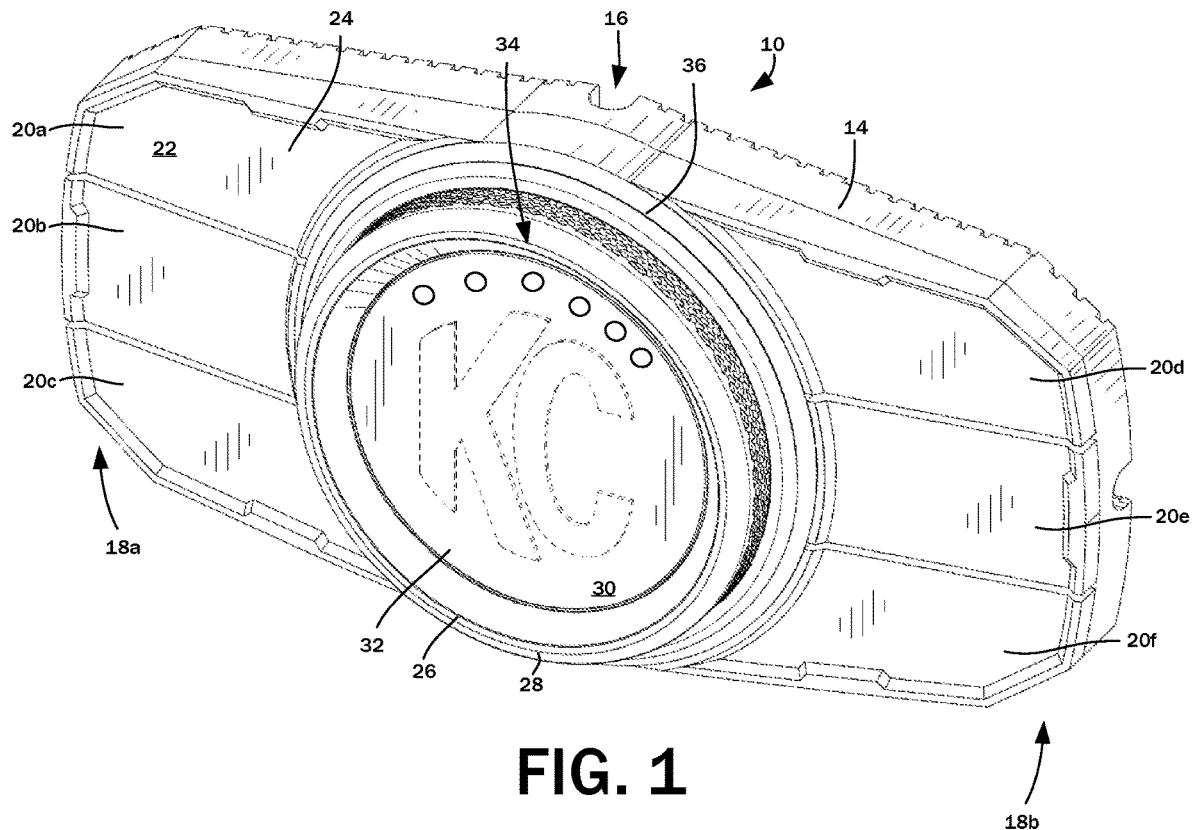
FIG. 1 is a front perspective view of a controller head unit of a reconfigurable vehicle accessory controller system in accordance with one embodiment of the present disclosure.
Figure 2:
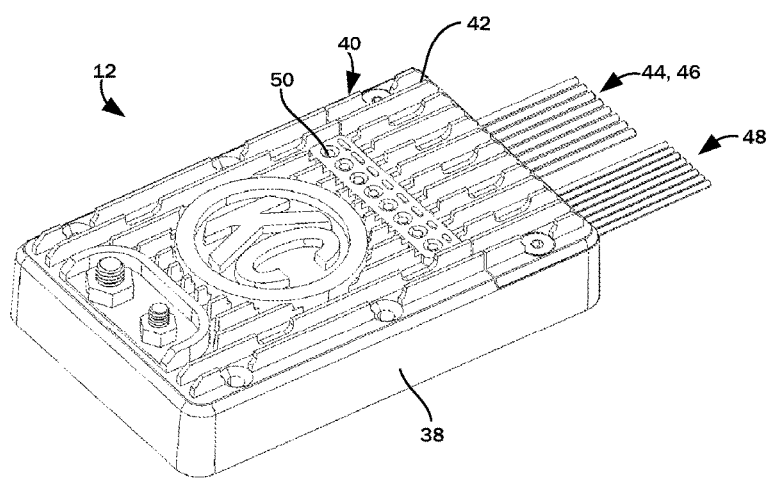
FIG. 2 is a front perspective view of a relay junction of a reconfigurable vehicle accessory controller system according to an embodiment of the present disclosure.

With reference to FIG. 1 and FIG. 2, one embodiment of the reconfigurable vehicle accessory controller system may include a controller head unit 10, and a relay junction box 12. The controller head unit 10 has a housing 14 enclosing various electronic circuits and devices as will be described in further detail below. The housing 14 has a generally elongate shape defined by a central region 16, a left side 18a, and a right side 18b. On the left side 18a is a set of switch buttons 20, including a first (top left) switch button 20a, a second (middle left) switch button 20b, and a third (bottom left) switch button 20c. Along these lines, on the right side 18b is another set of the switch buttons 20, including a fourth (top right) switch button 20d, a fifth (middle right) switch button 20e, and a sixth (bottom right) switch button 20f. The exemplary embodiment described herein refers to switch buttons, but it will be appreciated by those having ordinary skill in the art that any other input device may be utilized. To this end, the switch buttons may also be generally referenced as first input devices.

While reference will be generally made to the switch button 20, the visible part illustrated in FIG. 1 is more specifically an actuation surface 22 thereof, while the electromechanical switch device itself is mounted underneath the actuation surface 22 and therefore not visible. Mounted underneath the actuation surface 22 and visible therethrough is an indicator screen 24 on which various content may be displayed. According to one embodiment, the indicator screen 24 is a liquid crystal display (LCD) screen comprised of a matrix of activatable pixels, which in certain combinations and sequences of bitmap data represent text and graphical content. The outputted content on the indicator screen 24 may be time-varied to produce animation sequences and other graphical effects. The LCD indicator screen 24 may be color or monochrome and may be backlit for additional visibility. The output of the backlight may also be tinted a specific color. Notwithstanding the specifics of the indicator screen 24 discussed herein, it will be appreciated by those having ordinary skill in the art that any other type of electronic display screen, such as light emitting diode (LED) matrix displays and the like may be substituted without departing from the scope of the present disclosure. Each individual switch button 20a-20f is understood to incorporate a separate and independent indicator screen 24, though the present disclosure does not identify every one for the sake of conciseness. The indicator screen 24 may occupy the entirety or substantial entirety of the area of the actuation surface 22 and thus have an irregular outline as shown. Alternatively, the indicator screen 24 may have a rectangular shape that fits within the confines of the actuation surface 22.

The central region 16 of the housing 14 includes a scroll dial 26 that is circularly shaped and is rotatable. The scroll dial 26 is intended as one possible example in the illustrated embodiments, and any other suitable input device may be substituted without departing from the scope of the present disclosure. Accordingly, the scroll dial 26 may be referred to more generally as a second input device. The interior sides of each of the switch buttons 20 are partly circular to accommodate the circular shape of the scroll dial, while the exterior sides of each of the switch buttons 20 conform to the left and right outer profiles of the housing 14. The switch buttons 20a-20c on the left side are understood to be a mirror image of the respective switch buttons 20d-20f on the right side, to maintain an appearance of symmetry across the central scroll dial 26.

In one embodiment, the scroll dial 26 may be coupled to a rotary encoder that translates the rotational input applied to the scroll dial 26 to an input signal that is further processed by other components of the controller head unit 10. The direction of the rotation may be captured, along with the speed/acceleration of the rotation input. These values can be translated into certain commands that may be processed to navigate the user interface of the controller head unit 10, such as advancing to a next menu selection, a previous menu selection, and the like. A variety of modalities to capture the scroll dial/rotary input and translate the same into specific commands are known in the art, and those having ordinary skill in the art will recognize that any such modalities may be substituted.

The scroll dial 26 extends from the front face of the housing 14 beyond the face of the switch buttons 20 to increase the tactile surface area of its rim 28 that may be grasped by the user to provide the rotation input. Along these lines, the rim 28 may be constructed of rubber or other elastomeric material and/or knurled to increase grip. In addition to the rotation input, the scroll dial 26 may be coupled to a pushbutton switch that can be used to provide another input tied to or associated with the scroll dial 26. Again, with the second input device not being limited to the scroll dial 26, the pushbutton coupled thereto is likewise intended to be exemplary only. Any other suitable device may be utilized, and may be referred to more generally as a third input device. A front face 30 of the scroll dial 26 may thus be pressed inwardly along the rotation axis to actuate the pushbutton switch. The pushbutton switch also may be referred to as a home button 32.

The front face 30 of the scroll dial 26 additionally includes one or more pagination indicators 34. Specifically, the pagination indicators 34 may be a series of LEDs arranged circularly around the face of the home button 32 and may be selectively illuminated to indicate, among other things, the specific "page" of the indicator screen display outputs that is currently active. Additional details regarding such paging functionality and the indicator outputs generated therefor will be described more fully below. The illustrated embodiment of the controller head unit 10 is also understood to incorporate a status indicator ring 36 disposed behind the scroll dial 26. The status indicator ring 36 is understood to be an annular cover over a recess in which there may be one or more LED illuminators. Such cover may have a transparent or translucent surface that diffuses the light output from underneath. The LED illuminators may be capable of outputting light of varying colors, each of which correspond to a specific execution state of the controller user interface.

The configuration of the controller head unit 10 is presented by way of example only and not of limitation, and any other mechanical configuration may be substituted. For instance, although the illustrated embodiment incorporates six switch buttons 20, there may be fewer or more switch buttons. The size of the scroll dial 26, as well as its proportion to the housing 14 and/or the switch buttons 20 is also exemplary and may be varied according to aesthetic design choices.

Referring specifically to FIG. 2, the reconfigurable vehicle accessory controller system includes the relay junction box 12 that interfaces with various vehicle electronic devices controlled by the head unit 10. The relay junction box 12 includes a housing 38 with a top face 40 defined by a series of heat sink fins 42 that aid in the dissipation of heat generated by the relay devices housed therein. According to conventional practice, the heat sink portion of the housing 38 may be constructed of aluminum or other thermally efficient material.

In one embodiment, the relay junction box 12 also includes one or more relays with a load circuit input 44 connectible to a vehicle power source and a load circuit output 46 connectible to the vehicle accessory, as well as a control circuit line 48. As will be recognized by those having ordinary skill in the art, the electrical signal/power on the load circuit input 44 is connected to the load circuit output 46 when the control circuit line 48 is driven high while the load circuit input is disconnected from the load circuit output when the control circuit line is low, or vice versa depending on whether the relay is configured for normally open or normally closed operation. A variety of switch configurations such as single pole single throw, single pole double throw, etc. may be utilized depending on the interconnection specifications of the vehicle electronic devices.

In an exemplary embodiment, the relay junction box 12 incorporates up to twelve (12) relays, each of which are understood to be a solid-state type. Four of the relays may be capable of operating at up to 40 Amperes, another four of the relays may be capable of operating at up to 20 Amperes, and another four relays may be capable of operating at up to 10 Amperes, for a total maximum current output of the entirety of the relay junction box 12 being 150 Amperes. As a vehicle-installed electronics component, the relays are understood to operate on 12V direct current (DC) power. Along these lines, the controller head unit 10 likewise operates on 12V DC power. To protect against over-current conditions, each of the relays may be fused, and the voltage may be monitored to ensure proper operation of the connected vehicle accessories. In addition to electrical protection, there may be a thermal protection circuit that deactivates the relays in response to detecting an overheating condition.

The operation of each of the relays in the relay junction box 12 may be confirmed with a set of indicator lights 50 located on the top face 40 thereof. As shown in the specific embodiment of FIG. 2, the relay junction box 12 includes eight (8) indicator lights 50 corresponding to eight (8) pairs of load circuit inputs 44/load circuit outputs 46 and eight (8) control circuit lines 48. Multiple relay junction boxes 12 may be connected to the controller head unit 10 in the vehicle accessory controller system.

The relay junction box 12 according to various embodiments of the present disclosure specifically incorporate relay devices, though it is also possible for the relay junction box 12 to be implemented with bridged connections to remote relays, that is, relays that are not located in the relay junction box 12 itself. For purposes of inclusiveness, either implementation is understood to be encompassed by the broader term, relay connection. In this regard, a given relay connection may include the aforementioned load circuit input, load circuit output, and the control circuit line.

Figure 3:
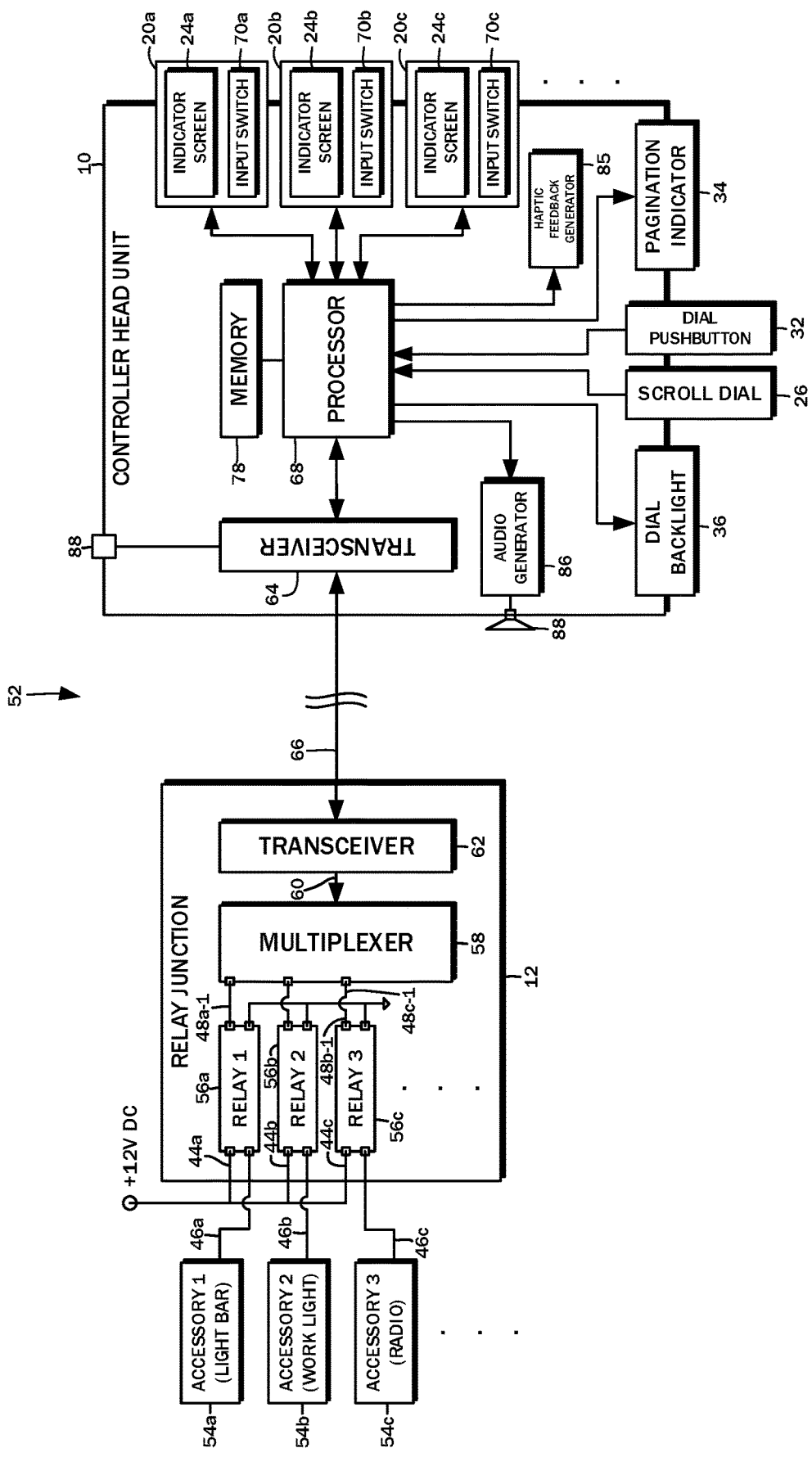
FIG. 3 is a block diagram of the reconfigurable vehicle accessory controller system including the controller head unit and the relay junction.

Referring now to the block diagram of FIG. 3, as indicated above, the controller head unit 10 and the relay junction box 12 constitute, at least partially in some embodiments, a reconfigurable controller system 52. Again, the relay junction box 12 is understood to be connectible to one or more switchable electronic accessory devices. In the specific example shown in the block diagram, there may be a first accessory 54a, a second accessory 54b, and a third accessory 54c. The first accessory 54a may be a light bar, the second accessory 54b may be a work light, and the third accessory 54c may be a radio. It is to be understood that the specific identity of these accessories 54 are presented by way of example only, and any other electronic accessory may be substituted. Moreover, there may be additional accessories that are similarly connected to the relay junction box 12, which can be up to thirty-two devices according to some embodiments of the present disclosure. These limits, too, are presented by way of example only, and it is deemed to be within the purview of those having ordinary skill in the art to make modifications to the other components of the reconfigurable controller system 52 to accommodate additional such accessory devices.

In further detail, the relay junction box 12 includes a first relay 56a that is connected to the first accessory 54a, a second relay 56b that is connected to the second accessory 56b, and a third relay 56c that is connected to the third accessory 56c. As can be seen, each accessory 54 is connected to a specific relay 56, so to the extent there are additional accessories 54 to be connected to the reconfigurable controller system 52, there is understood to be additional relays 56 therefor. Each relay 56 includes the aforementioned load circuit input 44, which is connected to 12V DC vehicle power supply. Thus, a first relay load circuit input 44a, a second relay load circuit input 44b, and a third relay load circuit input 44c are each tied to the vehicle power supply. The relays 56 also each include the load circuit output 46, with the first relay load circuit output 46a being connected to the first accessory 54a, the second relay load circuit output 46b being connected to the second accessory 54b, and the third relay load circuit output 46c being connected to the third accessory 54c.

Each relay 56 also includes the control circuit line 48, with an actuation thereof energizing the relay to connect the respective load circuit input 44 to the load circuit output 46 to power the connected accessory 54. In a typical embodiment, the relay 56 includes a control circuit input and a control circuit output, with each control circuit output being tied to ground to complete the circuit. A small signal voltage on the control circuit input is understood to activate relay 56. Thus, the first relay 56a includes a control circuit input 48a-1, the second relay 56b includes a control circuit input 48b-1, and the third relay 56c includes a control circuit input 48c-1.

Generally, the embodiments of the present disclosure contemplate the remote actuation of the vehicle accessories 54 via the relays 56 through control signals applied to the respective control circuit inputs. In one exemplary implementation, the control circuit inputs are connected to an upstream demultiplexer 58, which generates individual outputs for each of the control circuit inputs 48b-1, 48b-2, and 48b-3 of the relays 56 based upon an incoming signal stream carried over an output transmission line 60 from a transceiver 62. Although the transceiver 62 is illustrated as primarily serving a receive function in which incoming commands are passed to the relays 56, it is also possible for the transceiver 62 to accept downstream data such as status information from the relays 56 to transmit back to the controller head unit 10. To implement such features, the relay junction box 12 may include a processor, a programmable logic device, or other like device that can capture pertinent data that is in turn formed into a packet for the transceiver 62 to transmit. It is within the purview of those having ordinary skill in the art to make additional modifications to the relay junction box 12 to implement such features.

The incoming commands to the control circuit inputs of the relay junction box 12 may originate from the controller head unit 10 in one embodiment. Accordingly, the controller head unit 10 may also include a transceiver 64 that is configured to establish a data communications link 66 to the transceiver 62 of the relay junction box 12. One embodiment contemplates a wired connection for the data communications link 66, so a wiring harness that physically links the two transceivers 62, 64 may be provided. Any suitable physical interconnection conforming to any data link standard such as RS-232 or RS-485 serial communications, CAN (controller area network), or the like may be utilized. The use of formal transceivers 62, 64 is optional as well, and any other data link modality may be substituted. For example, the relay junction box 12 may be connected to the general-purpose input/output port (GPIO) of the processor 68 as a simple peripheral output device.

A wired connection (and hence the wire harness) is optional, as the data communications link 66 may instead be carried over a wireless communications modality. In such an implementation, the transceivers 62, 64 are understood to be radio frequency transceivers, and may be configured to conform to any one of a number of wireless communications standards such as Bluetooth, Bluetooth Low Energy, Zigbee, IEEE 802.11 Wireless LAN, and so forth.

While the data packet containing the commands to the control circuit inputs are transmitted to the relay junction box 12 by the transceiver 64, the commands themselves may be output or generated by a processor 68. Any suitable processor 68, including real-time microcontrollers, programmable logic devices, or general-purpose microprocessors may be utilized. As described above, the controller head unit 10 includes a plurality of switch buttons 20. The example of the controller head unit 10 shown in FIG. 3 has at least a first switch button 20a, a second switch button 20b, and a third switch button 20c. For the sake of brevity, the fourth, fifth, and sixth switch buttons 20d-20f have been omitted. Again, each of the switch buttons 20 has an independent indicator screen 24 and a corresponding input switch 70, with the first switch button 20a including a first indicator screen 24a and a first input switch 70a, the second switch button 20b including a second indicator screen 24b and a second input switch 70b, and the third switch button 20c including a third indicator screen 24c and a third input switch 70c.

The input switches 70 are mechanically actuated electrical switches, as discussed above. The output that is to be displayed on each of the indicator screens 24 is also generated by the processor 68, and when an input is received on the input switch 70, a corresponding input signal, that is, the input command, is generated and passed to the processor 68. It is also possible for the processor 68 to distinguish between different actuation durations, e.g., a short press (less than one second long), a long press (longer than one second), and press-and-hold (pressed down longer than 5 seconds). These functions and those of the controller head unit 10 described herein may be implemented as a series of programmed instructions that are executed by the processor 68. Such instructions may be stored in a non-transitory data storage medium such as the memory 78.

Figure 4:
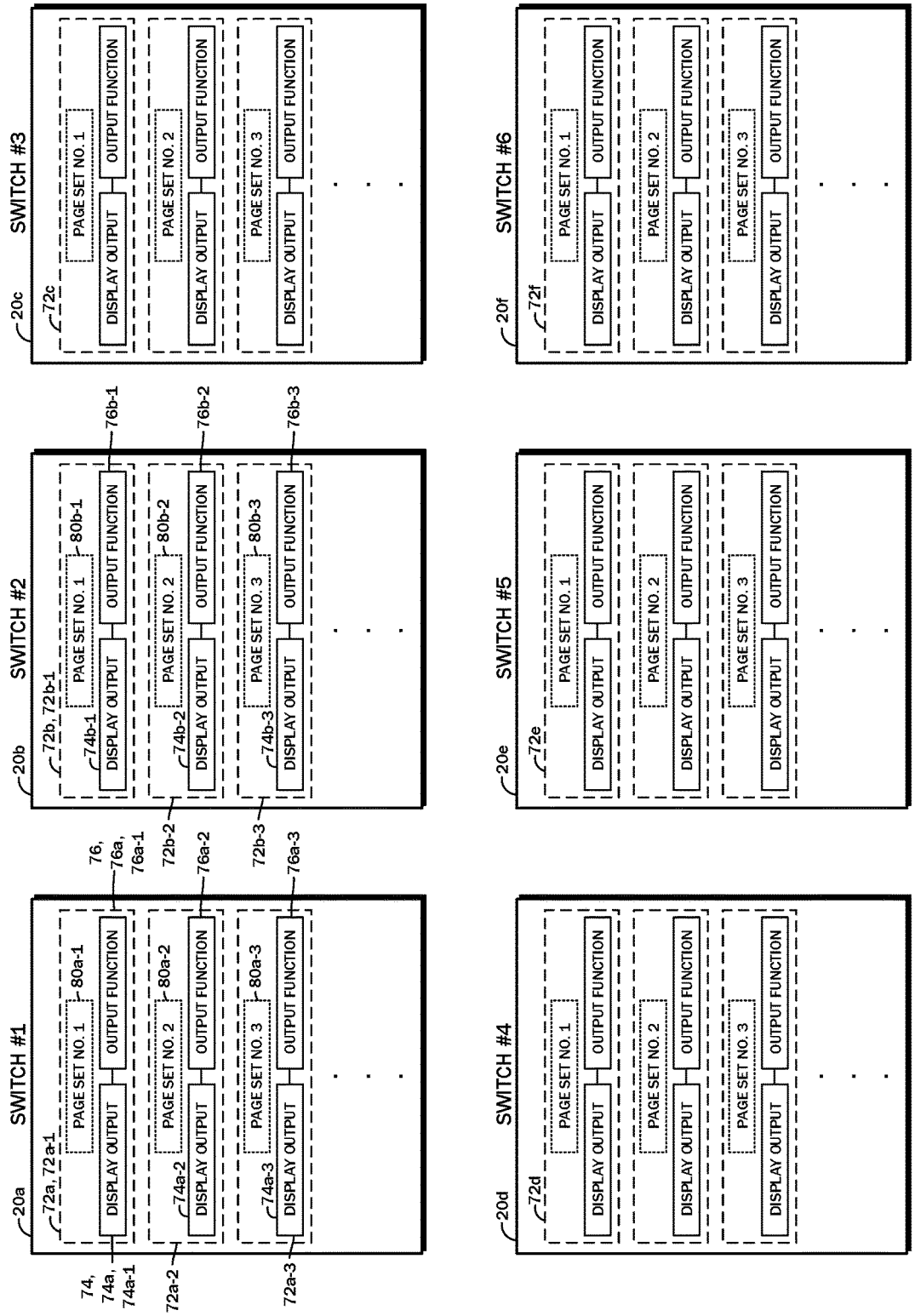
FIG. 4 is a diagram illustrating the data structure used to implement the reconfigurable vehicle accessory controller system.
Figure 5:
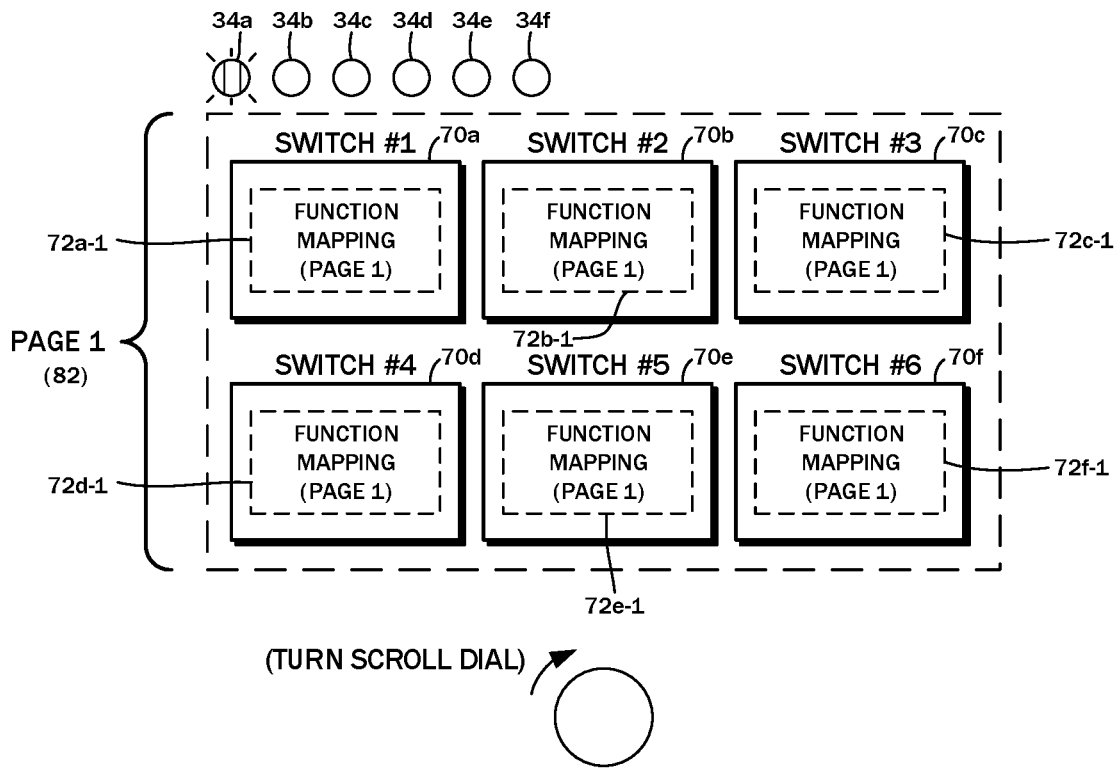
FIG. 5 is a diagram showing the input function mappings for each switch button of the vehicle accessory controller system and changes thereof in response to rotating a scroll dial.
Figure 5:
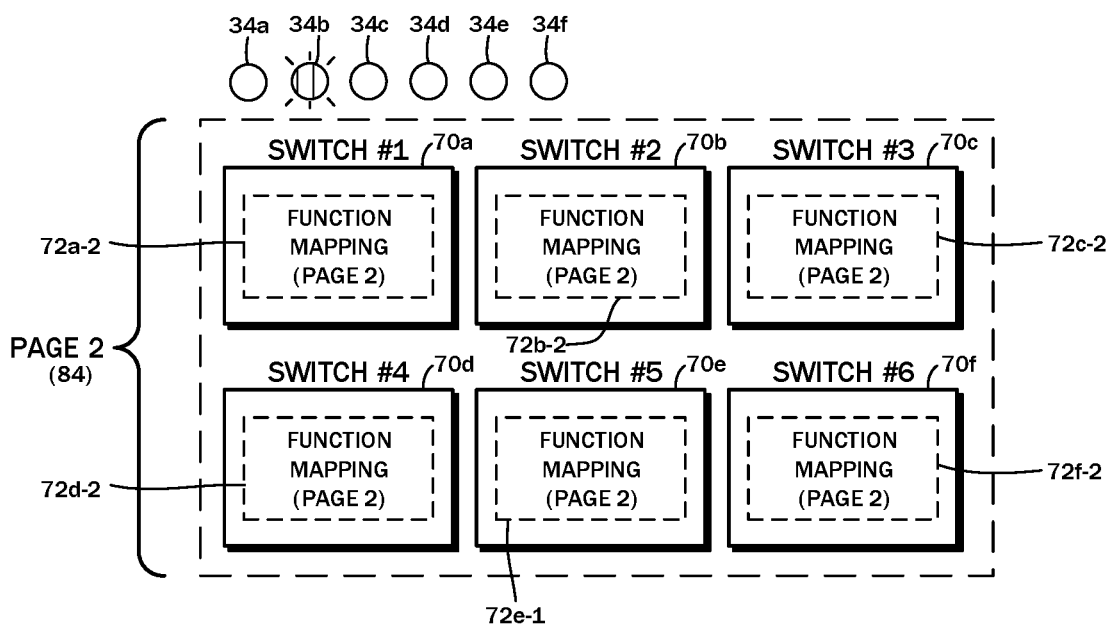

The specific output that is generated on a given one of the indicator screens 24 is programmable, that is, modifiable by the end user to correspond to the specific accessory 54 with which the switch button 20 is linked. With reference to the data structure diagram of FIG. 4, one or more input function mappings 72 can be assigned to each switch button 20. The programming/implementation specifics may vary, but in general, a set of data fields comprising a logical data object may define an association between a display output 74 and a corresponding output function 76 as a input function mapping 72. These records may be stored in a memory 78 connected to the processor 68.

By way of example, if the first switch button 20a is linked to the first accessory 54a, e.g., the light bar, the display output 74a may be programmed as the text "Light Bar." The indicator screen 24a may show the text "Light Bar," as retrieved from the display output data element. The display output data need not be limited to simple string characters, and may be specified as bitmaps representing alphanumeric characters, graphics, and so on. The particular way in which the display output data is converted to a series of electrical signals that activate corresponding pixels in the indicator screen 24 may vary, and well within the purview of those having ordinary skill in the art.

The output function 76 defines the action to take when the corresponding switch button 20 is actuated or pressed by the user. More particularly, defined in the output function 76 may be a destination address for a specific relay 56 that is connected to the selected accessory 54. In the example above, the output function 76a is set to turn on the light bar (accessory 54a), so the destination address is understood to be that of the relay 56a to which such accessory is connected. The destination address may be specified in the packet of data that is generated by the processor 68 and/or appended to the transmission from the transceiver 64 when so instructed by the processor 68. The foregoing pairing of the display output 74a to the output function 76a is set in an input function mapping 72a.

In addition to specifying the destination accessory/relay, the output function 76 also defines the manner in which the accessory is activated. According to one variation, the switch button 20 may function as a simple on/off toggle switch, where actuating the input switch 70 activates the relay and turns on the accessory 54 and actuating the input switch 70 again deactivates the relay 56 and turns off the accessory 54. This may be the default mode of operation, since user experience expectations for a pushbutton switch are in line with a toggle switch, so long as the switch button 20 is connected to an accessory 54 that is typically operated in such manner.

In another variation, the switch button 20 may function as a momentary switch, where the relay 56 is activated and the connected accessory 54 is turned on only so long as the input switch 70 remains actuated or pressed. This mode of operation may be utilized in accessories such as recovery winches where selective and manual actuation of the motor is desirable. A plurality of switch buttons 20 and corresponding relays 56 may be used for actuating the motor in differing directions.

In still another variation, the switch button 20 may function on a timer, that is, the relay 56 and the connected accessory 54 is activated for the duration of a countdown timer that is initiated with the actuation/press of the switch button 20. The timer duration is understood to be variable and programmable and is defined in one second increments up to a maximum value that may be, for example, 240 minutes. While the countdown timer is cycling, the remaining time may also be displayed on the indicator screen 24 in addition to the display output 74. Upon reaching the end of the countdown, the relay 56 and hence the connected accessory 54 is deactivated/turned off.

Another possible output function of the switch button 20 may be a dimmer. The dimmer output function may operate the same as a conventional on/off switch, but a graduated output reduction or increase to a predefined level upon actuation of the input switch 70 is also possible. A burst mode that is activated by actuating/pressing the switch button 20 upon reaching the graduated output endpoint is also contemplated. A timer-based burst mode is also possible, where actuating/pressing the switch button 20 temporarily increases the output to a maximum for a preset duration and returning to the reduced output level.

The foregoing variations in the output functions 76 may be implemented in different ways. One such modality is generating the signals corresponding to these functions by the processor 68 directly (e.g., generating a high signal and gradually decreasing the output voltage to implement the dimming function, counting down the timer on the processor 68 to implement the timer-based activation function, etc.) Alternatively, the processor 68 may generate commands that constitute instructions to another device to handle the specific implementation of these functions. Other modalities are also known in the art, but are omitted for the sake of brevity.

The other switch buttons 20 of the controller head unit 10 may similarly be assigned a display output 74 and an output function 76 as an input function mapping 72. Continuing with the example configuration shown in FIG. 3, the second switch button 20 may be configured to operate the second accessory 54b, e.g., the work light. This accessory may be assigned an input function mapping 72b that associates the display output 74b, e.g., the text "Work Light," and an output function 76b that is addressed to the second relay 56b/second accessory 54b and operates the same in a predefined manner. Likewise, each of the other switch buttons 20c, 20d, 20e, and 20f may have similar input function mappings 72c, 72d, 72e, and 72f, respectively.

The connection of multiple vehicle electronic accessories to the single controller head unit 10 and controlling the operation via individual switch buttons 20 assigned specifically to such accessory is contemplated in accordance with various embodiments of the present disclosure. It is also contemplated that multiple vehicle accessories can be assigned to a single switch button 20, and by way of example, the selection of a given one may be achieved with the scroll dial 26.

Such bindings may be implemented with a further data element of a page set number 80 that is associated with each input function mapping 72. Thus, the first input function mapping 72a-1 that links the display output 74a-1 to the output function 76a-1 is associated with a first page set 80a-1. Further, the data object for the first switch button 20a may include a second input function mapping 72a-2 that links another display output 74a-2 to an output function 76a-2, which is associated with a second page set 80a-2. Yet another accessory 54/relay 56 may be connected to the same first switch button 20a with a third input function mapping 72a-3 linking the display output 74a-3 to the output function 76a-3. This input function mapping 72a-3 may be associated with a third page set 80a-3.

The feature of multiple input function mappings 72 is also implemented for the other switch buttons 20b-2f of the controller head unit 10. For example, the second switch button 20b may include a second input function mapping 72b-1 that links a display output 74b-1 with an output function 76b-1 while associating it with a first page set 80b-1. Along these lines, there may be a second input function mapping 72b-2 linking a display output 74b-2 with the output function 76b-2 and associating it with a second page set 80b-2, and a third input function mapping 72b-3 linking a display output 74b-3 with the output function 76b-3 and associating it with a third page set 80b-3.

According to one embodiment of the present disclosure, the input function mappings 72 of all of the switch buttons 20 may be changed over together in response to user input. One implementation contemplates such user input to be provided via the scroll dial 26, e.g., rotation thereof. Referring now to the diagram of FIG. 6, a first page set collection 82 may be selected, with the input function mappings 72a-1, 72b-1, 72c-1, 72d-1, 72e-1, and 72f-1 that are associated with the first page sets 80a-1, 80b-1, 80c-1, 80d-1, 80e-1, and 80f-1, respectively, being bound to the specific one of the switch buttons 20a-20f. An indication of which page set collection is currently active is displayed on the pagination indicators 34 that is implemented as a series of six LEDs 34a-34f. Because the first page set collection 82 is active in the depicted example, the first LED 34a is illuminated. The pagination indicators 34 are connected to the processor 68, and the selection of which of the LEDs 34a-34f to illuminate made thereby.

When a scroll dial input is received, the command therefor is evaluated by the processor 68 to switch to the next page set collection. In the illustrated example, this is a second page set collection 84. The input function mappings 72a-2, 72b-2, 72c-2, 72d-2, 72e-2, and 72f-2 associated with the second pages sets 80a-2, 80b-2, 80c-2, 80d-2, 80e-2, and 803f-2, respectively are bound to the corresponding switch buttons 20a-20f. The pagination indicator 34 is switched to illuminate the second LED 34b.

The foregoing user interface is one basic implementation, and others with further enhancements are also contemplated. As indicated above, the scroll dial 26 may be coupled to a secondary pushbutton switch, that is, the home button 32. One example configuration setting for the home button 32 is to reset the input function mappings 72 to those of the first page set 80 in response to its actuation. Alternatively, the home button 32 may be used to confirm the activation of a given page set collection 84. For instance, when the scroll dial 26 is rotated, the binding of the input function mappings 72 may be temporary, and only upon pressing the home button 32 is the selection made permanent. Actuating one of the switch buttons 20 without this additional confirmation step may revert the bindings back to the previously selected page set collection. A different type of input modality other than the disclosed scroll dial 26 such as wheels, touch pads, etc. that can also be intuitively linked to the user interface concept of "turning" a page may also be utilized.

The scroll dial 26 may be implemented with a freely rotating rotary encoder that does not include any incremental mechanical stops that can be felt by the user as feedback that an input was made. Thus, the controller head unit 10 may include a haptic feedback generator 85 that generates a physical vibration (such as by actuating a small motor) in response to a detected input. The haptic feedback is intended to mimic the physical feeling of turning mechanical gears by hand. There may be additional visual feedback that can be output from the status indicator ring 36, also referred to as a dial backlight, as well as audible feedback from an audio generator 86 that is connected to and operated by the processor 68. The audio generator 86 may be connected to an acoustic transducer 87, which may be full-range miniature loudspeaker that can output the full range of audio frequencies, or a simpler piezeo-electric buzzer type transducer with limited audio reproduction range. A background execution process of the processor 68 may automatically generate an audio output in response to a scroll dial input or a switch button 20 input.

While the foregoing example switches the entire input page to another in response to an input received on the scroll dial, there may be embodiments in which less than all of the input function mappings 72 for a given input page are switched. For example, only one of the input function mappings 72 may be switched to another when there is an additional input modifying the execution of the programmed control instructions.

The embodiments of the present disclosure contemplate the switch buttons 20 and the scroll dial 26 being the primary input modality for the aggregated user interface to the accessories 54. As a secondary modality, a smartphone or other portable data communications device that can be loaded with an application that connects to the relay junction box 12, either directly or indirectly through the controller head unit 10 is also contemplated. The application may have a graphical user interface that mimics that of the switch buttons, and similarly page through multiple input function mappings 72 and operate the associated accessories 54. Where such linking capability is implemented on the controller head unit 10, there may be an external interface such as a USB port 88 to which the external device can connect. Alternative embodiments also contemplate wireless modalities such as Bluetooth, in which case the interface is understood to be an antenna and a Bluetooth transceiver.

The configuration options and the input function mappings 72 may be configured with such an external computing device, though it is expressly contemplated that the primary user interface elements of the controller head unit 10, that is, the switch buttons 20 and the scroll dial 26, may be used to modify these settings.

The particulars shown herein are by way of example and for purposes of illustrative discussion of the embodiments of the reconfigurable vehicle accessory controller system and are presented in the cause of providing what is believed to be the most useful and readily understood description of the principles and conceptual aspects. In this regard, no attempt is made to show details with more particularity than is necessary, the description taken with the drawings making apparent to those skilled in the art how the several forms of the present disclosure may be embodied in practice.

What is claimed is:

1. A reconfigurable switch controller connectible to one or more accessory devices, the controller comprising:
   a data processor;
   a plurality of switch buttons each having an independent, physically separated indicator screen coupled to a respective one of the first input devices, the switch buttons each being connected to the data processor and being receptive to one or more display outputs generated by the data processor, and input commands being transmitted to the data processor from actuated ones of the plurality of switch buttons; and
   a scroll dial receptive to a rotary input and connected to the data processor;
   wherein the data processor defines one or more switch function mappings for each of the switch buttons, a given one of the switch function mappings defining an association of a specific one of the display outputs to an output function generated to a given one of the one or more accessory devices in response to a specific one of the input commands from an actuation of the switch button, one of one or more page sets of activated ones of switch function mappings for each of the switch buttons being selectable based upon the rotary input to the scroll dial.

2. The controller of claim 1, further comprising:
   a data transmitter connected to the data processor, the data transmitter being in communication with a relay junction connected to the one or more accessory devices.

3. The controller of claim 1, wherein the indicator screens of the switch buttons are liquid crystal displays, and the one or more display outputs are graphical bitmap data.

4. The controller of claim 1, further comprising:
   a pagination indicator displaying an output corresponding to an activated one of the one or more page sets.

5. The controller system of claim 1, wherein the output function is selected from a group consisting of: an on/off switching function, a momentary switching function, a timer switch function, and a dimmer switch function.

6. The controller system of claim 1, further comprising a haptic feedback generator, a haptic feedback response being outputted thereby in response to the inputs on the scroll dial.

7. The controller system of claim 1, wherein the data processor is connectible to a relay junction with a plurality of relay connections each including at least a load circuit input, a load circuit output connectible to corresponding switchable electronic device, and a control circuit line.

8. The controller system of claim 7, wherein the data process is connectible to a relay junction over a wiring harness.

9. The controller system of claim 7, wherein the plurality of switch buttons is each a mechanically actuated electrical switch.

\* \* \* \* \*